United States Patent Office 3,526,617
Patented Sept. 1, 1970

3,526,617
WATER-SOLUBLE 2:1-CHROMIUM COMPLEX MONOAZO DYESTUFFS CONTAINING ETHIONYLAMINO OR VINYL SULFONAMIDO GROUPS
Hermann Fuchs, Kelkheim, Taunus, Fritz Meininger, Frankfurt am Main, Fritz Osterloh, Bad Soden, Taunus, and Siegfried Schiessler, Frankfurt am Main, Germany, assignors to Farbwerke Hoechst Aktiengesellschaft vormals Meister Lucius & Bruning, Frankfurt am Main, Germany, a corporation of Germany
No Drawing. Filed June 22, 1967, Ser. No. 647,932
Claims priority, application Germany, June 24, 1966, F 49,546
Int. Cl. C09b 45/06, 45/16
U.S. Cl. 260—145                                6 Claims

ABSTRACT OF THE DISCLOSURE

Water-soluble fiber-reactive 1:2-chromium complex monoazo dyestuffs containing as reactive groupings one of the groupings of the formulae

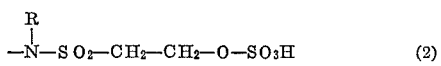

and

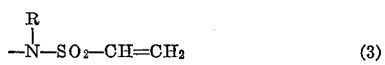

in which R represents hydrogen, methyl or ethyl. These dyestuffs are suitable for dyeing or printing materials of native or regenerated cellulose, wool, silk, polyamide or polyurethane fibers or leather, yielding on said materials dyeings or prints of excellent fastness to light and to wetting upon washing, milling, decatizing and acid overdyeing.

---

The present invention relates to new water-soluble 2:1-chromium complex monoazo dyestuffs and to a process for preparing them. More particularly, the present invention relates to water-soluble 2:1-chromium complex monoazo dyestuffs which, in the form of the free acids, correspond to the general formula

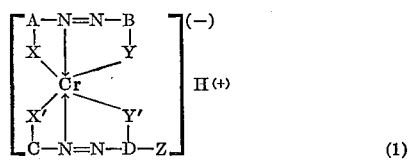

wherein A and C represent phenylene or naphthylene radicals, B and D represent radicals of coupling components which couple in a position adjacent to Y or Y', X and X' represent —O— or —COO—, Y and Y' represent —O— or —NH—, Z represents a grouping of the formula

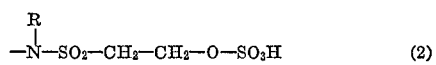

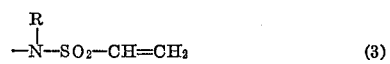

wherein R represents —H, —CH$_3$ or —C$_2$H$_5$ and which, in the case Z represents a grouping of the said Formula 3, contain at least one sulfonic acid group.

We have found that the new water-soluble 2:1-chromium complex monoazo dyestuffs of the aforementioned general Formula 1 can be prepared by reacting a 1:1-chromium complex monoazo dyestuff of the general formula

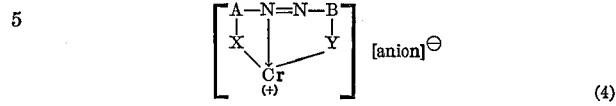

wherein A, B, X and Y have the meanings given above, with equimolecular quantities of a monoazo dyestuff which is capable of forming a metal complex and which corresponds to the general formula

wherein C, D, X', Y', and Z have the meanings given above, in the presence of acid-binding agents in an aqueous or aqueous-organic medium at a pH in the range of from 5.5 to 8.5, preferably at about pH 6, and at temperatures in the range of from about 50° to about 100° C., preferably in the range of from about 65° to 75° C.

The phenylene or naphthylene nuclei standing for A and C in the aforementioned Formulae 1, 4 and 5 may carry, as substituents, halogen atoms, preferably chlorine atoms, nitro groups, alkyl groups such, for example, as methyl or ethyl groups, alkoxy groups such, for example, as the methoxy group, sulfonic acid groups, sulfonic acids amide groups or N-monoalkyl- or N-dialkyl-sulfonic acid amide groups, the alkyl groups of which may contain, for example, 1 to 4 carbon atoms.

As coupling components B, there may be used hydroxy- and amino-derivatives of naphthalene as well as pyrazolone-derivatives such as 1-phenyl-3-lower alkyl-5-pyrazolone, which may contain sulfonic acid groups. There may be mentioned, for example, 1-naphthol, 1-naphthol-4-sulfonic acid, 2-naphthol-5-sulfonic acid, 2-naphthol, 2-naphthylamine-6-sulfonic acid, 1-(4'-sulfophenyl)-3-methyl-5-pyrazolone.

Examples of coupling components D are 2-(N-methyl-N-ethionyl)-amino-8-naphthol-6-sulfonic acid, 2-(N-ethionyl)-amino-8-naphthol-6-sulfonic acid, 2-(N-methyl-N-ethionyl)-amino-5-naphthol-7-sulfonic acid, 2-(N-ethionyl)-amino-5-naphthol-7-sulfonic acid and 3- or 4-(N-methyl-N-ethionyl-amino)-acetoacetanilide.

As anions in the aforementioned general Formula 4 there may be used anions which do not form complexes for example, nitrate, sulfate, formiate, and acetate ions, especially, however, chloride ions.

The reaction is carried out in water or in mixtures of water with water-miscible organic solvents such, for example, as acetone, ethanol, or ethylene glycol.

The 2:1-chromium complex monoazo dyestuffs obtained according to the present invention are isolated by salting out with sodium chloride or potassium chloride.

The 2:1-chromium complex dyestuff of the general Formula 1, wherein Z represents the group

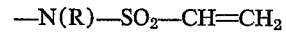

is obtained from the corresponding 2:1-chromium complex of the general Formula 1, in which Z represents the group —N(R)—SO$_2$—CH$_2$—CH$_2$—O—SO$_3$H, upon treatment with acid-binding agents, preferably with sodium hydroxide in aqueous solution at temperatures in the range of from about 0° to 80° C., preferably at between about 40° and 60° C., or by reacting a 1:1-chromium complex monoazo dyestuff of the general Formula 4 with a monoazo dyestuff capable of forming metal complexes and corresponding to the general Formula 5, in which Z represents the group —N(R)—SO$_2$—CH=CH$_2$, and which is obtained from the corresponding monoazo dyestuff of the general Formula 5, in which Z represents the group —N(R)—SO$_2$—CH$_2$—CH$_2$—O—SO$_3$H, upon treatment in an aqueous solution with acid-binding agents, preferably sodium hydroxide solution at temperatures in the range of about 0° to 80° C., preferably in the range of 40° to 60° C.

The 1:1-chromium complex monoazo dyestuff of the general Formula 4 is obtained by heating to a temperature in the range of 80° to 115° C., preferably to 100° C., a monoazo dyestuff of the general formula

(6)

wherein A, B, X and Y have the meanings given above, with equivalent amounts of a chromium-yielding agent, such as chromium(III)chloride, chromium(III)acetate or chromium(III)formiate in n-butanol or ethylene glycol. A modification of the method of the present invention comprises in reducing hexavalent chromium, used in the form of an alkali metal chromate, to trivalent chromium by means of n-butanol or ethylene glycol in the presence of concentrated hydrochloric acid, said acid being used in such an amount that molar ratio of alkali metal chromate to hydrochloric acid is 1:4.

As examples of amines which are suitable for the preparation of monoazo dyestuffs of the general Formulae 5 and 6, there may be mentioned: 2-amino-phenol, 2-amino-4-methoxyphenol, anthranilic acid, 4- and 5-sulfoanthranilic acid, 4- and 5-nitro-2-aminophenol, 4,6-dinitro-2-aminophenol, 4 - nitro - 2-aminophenol-6-sulfonic acid, 6-nitro-2-amino-phenol-4-sulfonic acid, 4- and 5-chloro-2-aminophenol, 6 - chloro - 2-aminophenol-4-sulfonic acid, 2-aminophenol-4-sulfonic acid, 2-aminophenol-4-sulfonic acid amide, 2-aminophenol-4-sulfonic acid-N-monomethyl- and -N-dimethylamide, 2-aminophenol-4-sulfonic acid-N-monoethyl- and N-diethylamide, 2-aminophenol-4-sulfonic acid-N-(n-butyl)- and -N-di-(n-butyl)-amide, 2 - amino-4-methylphenol, 1-amino-2-naphthol-4-sulfonic acid, 6-nitro-1-amino-2-naphthol-4-sulfonic acid.

The monoazo dyestuffs which are capable of forming metal complexes and which correspond to the general Formulae 5 and 6 can be prepared according to known methods by diazotization of the aforementioned amines and coupling in an aqueous medium with the above described coupling components at temperatures in the range of from about 0° to 40° C., preferably 10° to 20° C., at a pH in the range from 5.0 to 10.0, in the case of coupling components containing ethionyl amino groups at a pH in the range of 6.5 to 8.5. The water-soluble monoazo dyestuffs are isolated from the neutral aqueous solution by salting out with sodium chloride and filtration. The water-insoluble monoazo dyestuffs, are isolated by simple filtration.

The 2:1-chromium complex monoazo dyestuffs obtained according to the process of the present invention are suitable for the dyeing and printing of materials of various kinds. Thus, for example, they can be used for the dyeing and printing of fibers of natural or regenerated cellulose, and of cotton, linen or viscose rayon fabrics. They are mainly used, however, for the dyeing and printing of fabrics made of nitrogen-containing fibers of natural or synthetic origin such, for example, as fabrics made of silk, wool, polyamide or polyurethane fibers; leather too can be dyed or printed with the dyestuffs of the present invention. With regard to the above-mentioned nitrogen-containing materials the new dyestuffs are suitable above all for the dyeing of wool.

The new metal complex monoazo dyestuffs are used according to the dyeing and printing methods generally employed in the art. For example, they may be applied onto cellulosic textiles according to a dyeing or printing method commonly used for reactive dyestuffs and they may be fixed in the presence of an acid-binding agent. For the preferred dyeing of textile materials which are provided with nitrogen-containing fibers, in particular such as wool and polyamide fibers, the new metal complex dyestuffs are applied, for example, from a neutral or weakly acid dyebath, having a constant or practically constant pH value. Dyeing is carried out preferably at temperatures in the range of 70° to 120° C. in the presence of compounds commonly used for the dyeing of nitrogen-containing textile materials, for example, sodium sulfate, ammonium acetate, surface-active compounds such as quaternary ammonium salts and non-ionic dispersing agents. The pH-value of the dyebath may also be changed during the dyeing process by the addition of acids or acid salts, or alkalies or alkaline salts, for example, by beginning dyeing at pH 4 and increasing the pH in the course of the dyeing process to 7.5.

The metallized monoazo dyestuffs obtained according to the present invention have an excellent affinity to textile fabrics made of nitrogen-containing natural or synthetic fibers, especially to fabrics made of wool. The dyeings produced with the dyestuffs of the present invention on textile fabrics or fleece of the afore-said kind are distinguished by an excellent fasteness to light and to wetting upon washing, milling, decatizing or acid overdyeing.

The preferably used 2:1-chromium complex monoazo dyestuffs of the general Formula 1 are those in which Z is the group

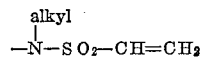

since these dyestuffs give on wool dyeings which have a better fastness to decatizing than that of dyeings produced with chromium complex monoazo dyestuffs of the general Formula 1 which contain for Z the group

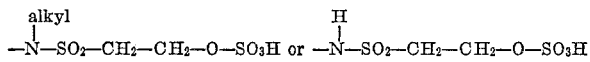

The following examples illustrate the invention but they are not intended to limit it thereto.

EXAMPLE 1

38.6 parts by weight (0.1 mol) of the 1:1-chromium complex dyestuff of the formula

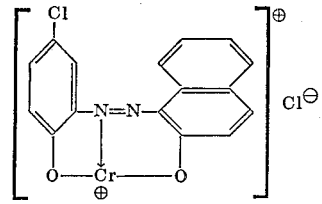

60.6 parts by weight (0.1 mol) of 6-(2′-hydroxy-4′-nitrophenyl - 1′ - azo) - 2 - (N - methyl - N - ethionylamino)-5-naphthol-7-sulfonic acid, 82.0 parts by weight (0.6 mol) of crystallized sodium acetate, 1000 parts by weight of water and 160 parts by weight of acetone were heated, while stirring, for 6 hours to 70° C. After cooling to room-temperature, the 2:1-chromium complex monoazo dyestuff that had formed was salted out with 150 parts by weight of sodium chloride, filtered off and dried. When applied from an acetic acid bath the blue-black dyestuff-powder dyed wool a blue-grey shade. The dyeing had a very good fastness to light and to wetting. The dyestuffs corresponded to the formula

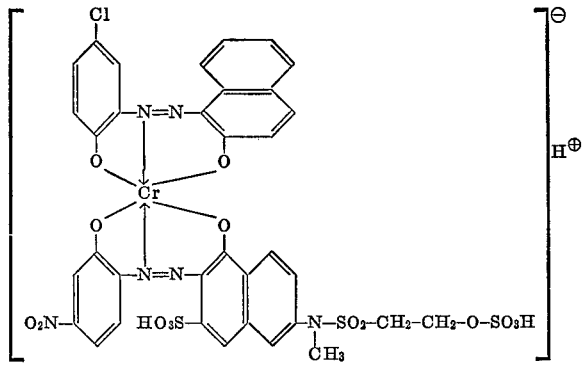

EXAMPLE 2

38.6 parts by weight (0.1 mol) of the 1:1-chromium complex dyestuff of the formula

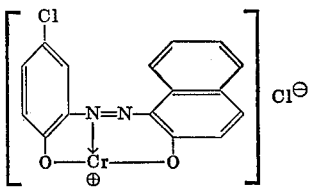

59.55 parts by weight (0.1 mol) of 7-(2'-hydroxy-5'-chlorophenyl - 1' - azo) - 2-(N-methyl-N-ethionylamino)-8-naphthol-6-sulfonic acid and 82.0 parts by weight (0.6 mol) of crystallized sodium acetate were heated, for 6 hours, while stirring, in a mixture of 1000 parts by weight of water and 160 parts by weight of acetone. After cooling to room temperature, the 2:1-chromium complex monoazo dyestuff that had formed was then salted out with 150 parts by weight of sodium chloride and filtered off. The wet dyestuff was dissolved in 750 parts by weight of water at 50° C., while stirring; to the solution, 20 parts by weight of a sodium hydroxide solution having a strength of 33% by weight were added and the whole was stirred for 5 minutes. Thereupon, the pH was adjusted to 6.5 by adding a small amount of 5 N hydrochloric acid. The dyestuff was salted out with 115 parts by weight of sodium chloride and dried. The blue-black dyestuff of the formula

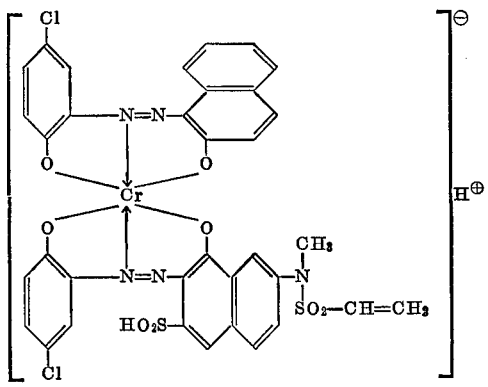

dyed wool and polyamide fibers, when applied from an acetic acid bath, blue-violet shades having excellent fastness to light and to wetting.

EXAMPLE 3

42.45 parts by weight (0.1 mol) of the 1:1-chromium complex dyestuff of the formula

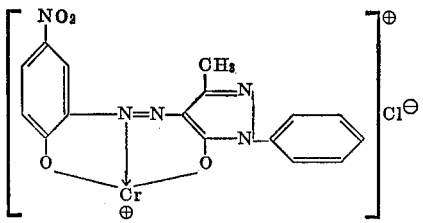

59.55 parts by weight (0.1 mol) of 7-(2'-hydroxy-4'-chlorophenyl - 1' - azo) - 2-(N-methyl-N-ethionylamino)-8-naphthol-6-sulfonic acid, 82.0 parts by weight (0.6 mol) of crystallized sodium acetate, 1000 parts by weight of water and 160 parts by weight of acetone were heated while stirring, for 5 hours to 70° C. After cooling to room temperature, 200 parts by weight of sodium chloride were added and the 2:1-chromium complex monoazo dyestuff that had precipitated was filtered off. The wet dyestuff was dissolved, while stirring, in 750 parts by weight of water at 50° C., then 20 parts by weight of a sodium hydroxide solution having a strength of 33% by weight were added, the whole was stirred for 5 minutes and then the pH-value of the solution was adjusted to 6.5 by adding a small amount of 5 N hydrochloric acid.

The dyestuff was salted out with 150 parts by weight of sodium chloride, filtered off and dried. The dyestuff obtained corresponded to the formula

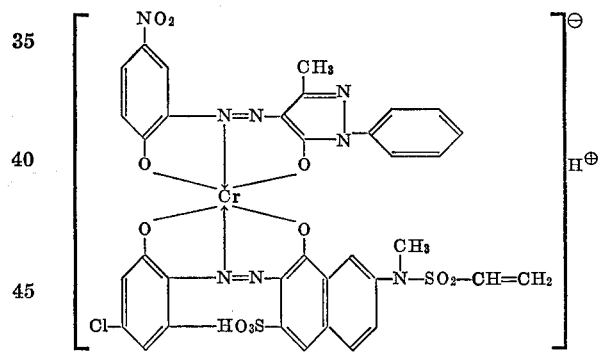

and dyed wool reddish brown shades having excellent fastness to light and to wetting.

EXAMPLE 4

42.45 parts by weight (0.1 mol) of the 1:1-chromium complex dyestuff of the formula

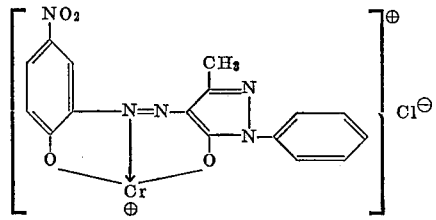

68.6 parts by weight (0.1 mol) of 7-(2'-hydroxy-3'-sulfo-5'-nitrophenyl - 1' - azo) - 2-(N-methyl-N-ethionylamino)-8-Naphthol-6-sulfonic acid, 82.0 parts by weight (0.6 mol) of crystallized sodium acetate, 1000 parts by weight of water and 160 parts by weight of acetone were heated, while stirring, for 6 hours to 70° C. After cooling to room temperature, the 2:1-chromium complex monoazo dyestuff that had formed was salted out with 150 parts by weight of sodium chloride and filtered off. The wet dyestuff was dissolved, while stirring, in 750 parts by weight of water at 50° C., the solution was combined with 20 parts by weight of a sodium hydroxide solution having a strength of 33% by weight and the whole was stirred for 5 minutes. Then, the pH-value was adjusted to 6.5 by adding a small amount of 5 N hydrochloric acid. The dyestuff which had been precipitated by means of 116 parts by weight of sodium chloride, was filtered off and dried.

The brown-black dyestuff which corresponded to the formula

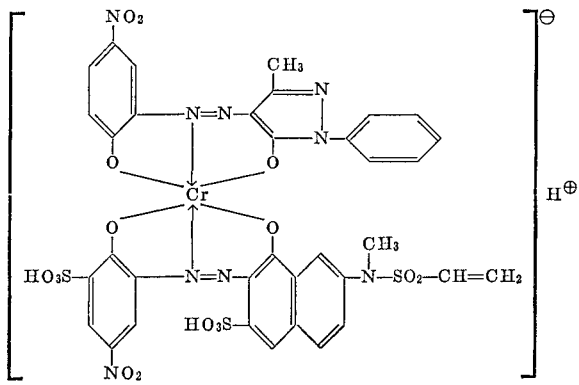

dyed wool, when applied from an acetic acid dye bath, dark brown shades having very good fastness to light and to wetting.

EXAMPLE 5

48.8 parts by weight (0.1 mol) of the 1:1-chromium complex dyestuff of the formula

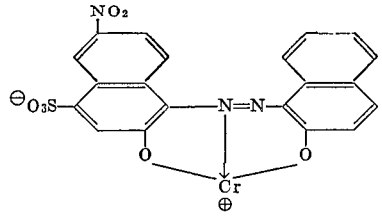

55.4 parts by weight (0.1 mol) of 7-(2'-hydroxy-4'-nitrophenyl - 1' - azo) - 2 - (N-methyl-N-ethionylamino)-8-naphthol-6-sulfonic acid and 1000 parts by weight of water were heated, while stirring, to 80° C. The pH-value of the solution was maintained at 6.0 to 6.5 by the dropwise addition of 110 parts by weight of a sodium carbonate solution having a strength of 10% by weight. The whole was allowed to react for 5 hours, it was then cooled to room temperature and the 2:1-chromium complex monoazo dyestuff that had formed was salted out with 250 parts by weight of sodium chloride, filtered off and dried. The black dyestuff of the formula

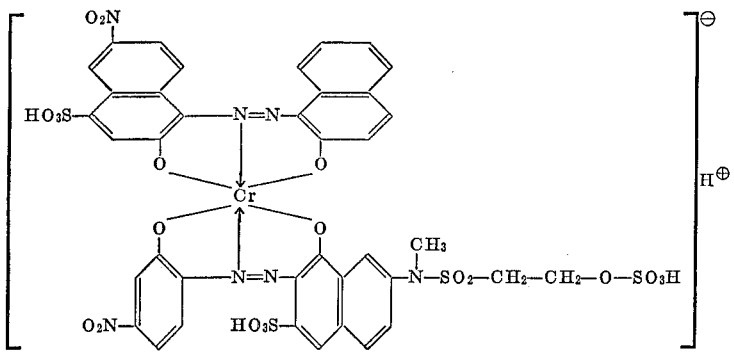

dyed wool, when applied from an acetic acid dyebath, grey shades having very good fastness to light and to wetting.

The following table contains further examples of 2:1-chromium complex monoazo dyestuffs prepared by the processes described in the foregoing Examples 1–5.

| Example | 1:1-chromium complex monoazo dyestuff | | Metal-free monoazo dyestuff | | Shade on wool. |
| --- | --- | --- | --- | --- | --- |
| | Amine (A) | Coupling component (B) | Amine (C) | Coupling component (D) | |
| 6 | 4-nitro-2-aminophenol | 1-phenyl-3-methyl-pyrazolone-5. | 4-nitro-2-aminophenol | 2-(N-methyl-N-ethionylamino)-8-naphthol-6-sulfonic acid. | Brown. |
| 7 | do | do | 5-nitro-2-aminophenol | 2-(N-methyl-N-ethionylamino)-5-naphthol-7-sulfonic acid. | Do. |
| 8 | do | do | 4-nitro-2-aminophenol-6-sulfonic acid. | 2-(N-ethionylamino)-8-naphthol-6-sulfonic acid. | Do. |
| 9 | do | do | 4-nitro-2-aminophenol | do | Do. |
| 10 | do | do | 4-chloro-2-aminophenol | do | Do. |
| 11 | do | do | 6-chloro-2-aminophenol-4-sulfonic acid. | 2-(N-methyl-N-vinylsulfonylamino)-8-naphthol-6-sulfonic acid. | Do. |
| 12 | do | do | 2-aminophenol-4-sulfonic acid. | do | Do. |
| 13 | do | do | 4-chloro-2-aminophenol | do | Do. |
| 14 | do | do | 5-nitro-2-aminophenol | do | Do. |
| 15 | do | 2-naphthol | 4-nitro-2-aminophenol-6-sulfonic acid. | 2-(N-methyl-N-ethionylamino)-8-naphthol-6-sulfonic acid. | Grey. |
| 16 | do | do | 5-chloro-2-aminophenol | do | Blue-violet. |
| 17 | do | do | 4-nitro-2-aminophenol | 2-(N-methyl-N-ethionylamino)-5-naphthol-7-sulfonic acid. | Do. |
| 18 | do | do | 6-chloro-2-aminophenol-4-sulfonic acid. | 2-(N-methyl-N-ethionylamino)-8-naphthol-6-sulfonic acid. | Grey. |
| 19 | do | do | 4,6-dinitro-2-aminophenol | do | Do. |
| 20 | do | do | 5-nitro-2-aminophenol | do | Do. |
| 21 | do | do | 4-nitro-2-aminophenol | 2-(N-methyl-N-vinylsulfonyamino)-8-naphthol-6-sulfonic acid. | Do. |
| 22 | 5-nitro-2-aminophenol | 1-phenyl-3-methyl-pyrazolone-5. | 2-amino-phenol-4-sulfonic acid. | 2-(N-methyl-N-ethionylamino)-8-naphthol-6-sulfonic acid. | Blue-red. |
| 23 | do | do | 4-chloro-2-aminophenol | do | Red-violet. |
| 24 | do | do | 2-amino-phenol-4-sulfonamide. | do | Blue-red. |
| 25 | do | do | 4-nitro-2-aminophenol | 2-(N-methyl-N-vinylsulfonyl-amino)-8-naphthol-6-sulfonic acid. | Brown. |

TABLE—Continued

| Example | 1:1-chromium complex monoazo dyestuff | | Metal-free monoazo dyestuff | | Shade on wool |
|---|---|---|---|---|---|
| | Amine (A) | Coupling component (B) | Amine (C) | Coupling component (D) | |
| 26 | ...do... | ...do... | Anthranilic acid | 4-(N-methyl-N-ethionylamino)-acetoacetanilide. | Red. |
| 27 | ...do... | 2-naphthol | 6-chloro-2-aminophenol-4-sulfonic acid. | 2-(N-methyl-N-ethionyl-amino)-8-naphthol-6-sulfonic acid. | Grey. |
| 28 | ...do... | ...do... | 2-aminophenol-4-sulfonic acid. | ...do... | Do. |
| 29 | ...do... | ...do... | 4-chloro-2-aminophenol | ...do... | Do. |
| 30 | ...do... | ...do... | 4-nitro-2-aminophenol-6-sulfonic acid. | 2-(N-ethionylamino)-8-naphthol-6-sulfonic acid | Do. |
| 31 | ...do... | ...do... | 4-nitro-2-aminophenol | ...do... | Do. |
| 32 | ...do... | ...do... | 5-nitro-2-aminophenol | ...do... | Do. |
| 33 | ...do... | ...do... | 4-chloro-2-aminophenol | ...do... | Do. |
| 34 | ...do... | ...do... | 4-nitro-2-aminophenol-6-sulfonic acid. | 2-(N-methyl-N-vinylsulfonylamino)-8-naphthol-6-sulfonic acid. | Do. |
| 35 | ...do... | ...do... | 5-nitro-2-aminophenol | ...do... | Do. |
| 36 | ...do... | ...do... | 4-nitro-2-aminophenol | ...do... | Do. |
| 37 | 4-chloro-2-aminophenol. | 1-phenyl-3-methyl-pyrazolone-5. | 4-nitro-2-aminophenol-6-sulfonic acid. | ...do... | Brown. |
| 38 | 4-chloro-2-aminophenol | ...do... | 5-chloro-2-aminophenol | ...do... | Do. |
| 39 | 4-chloro-2-aminophenol | ...do... | 4-nitro-2-aminophenol | ...do... | Do. |
| 40 | ...do... | 2-naphthol | 6-chloro-2-aminophenol-4-sulfonic acid. | ...do... | Violet. |
| 41 | ...do... | ...do... | 2-aminophenol-4-sulfonic acid. | ...do... | Do. |
| 42 | ...do... | ...do... | 4-chloro-2-aminophenol | 2-(N-methyl-N-ethionyl-amino)-5-naphthol-7-sulfonic acid. | Do. |
| 43 | ...do... | ...do... | 5-nitro-2-aminophenol | 2-(N-methyl-N-vinylsulfonylamino)-8-naphthol-6-sulfonic acid. | Grey. |
| 44 | ...do... | ...do... | 4-nitro-2-aminophenol-6-sulfonic acid. | 2-(N-ethionylamino)-8-naphthol-6-sulfonic acid. | Do. |
| 45 | ...do... | ...do... | 4-nitro-2-aminophenol | ...do... | Do. |
| 46 | ...do... | ...do... | 5-nitro-2-aminophenol | ...do... | Do. |
| 47 | ...do... | 2-naphthol | 4-chloro-2-aminophenol | ...do... | Blue-violet. |
| 48 | ...do... | 1-phenyl-3-methyl-pyrazolone-5. | 4-sulfo-anthranilic acid. | 4-(N-methyl-N-vinylsulfonylamino)-acetoacetanilide. | Yellow. |
| 49 | ...do... | ...do... | 2-aminophenol-4-sulfonic acid. | ...do... | Do. |
| 50 | 4-nitro-2-aminophenol | ...do... | 4-sulfo-anthranilic acid | ...do... | Do. |
| 51 | ...do... | 2-naphthylamine-6-sulfonic acid. | Anthranilic acid | ...do... | Green. |
| 52 | ...do... | ...do... | 4-sulfo-anthranilic acid | ...do... | Do. |
| 53 | 5-nitro-2-aminophenol | 2-naphthol | Anthranilic acid | 4-(N-methyl-N-ethionylamino)-acetoacetanilide. | Do. |
| 54 | 2-aminophenol | ...do... | 4-chloro-2-aminophenol | 2-(N-methyl-N-ethionyl-amino)-5-naphthol-7-sulfonic acid. | Violet. |
| 55 | 2-amino-4-methyl phenol. | ...do... | ...do... | ...do... | Do. |
| 56 | 1-amino-2-naphthol-4-sulfonic acid. | ...do... | 4-nitro-2-aminophenol | 2-(N-methyl-N-ethionylamino)-8-naphthol-6-sulfonic acid. | Grey. |
| 57 | 6-nitro-1-amino-2-naphthol-4-sulfonic acid. | ...do... | ...do... | ...do... | Do. |
| 58 | ...do... | 1-naphthol | ...do... | ...do... | Do. |
| 59 | 4,6-dinitro-2-aminophenol. | 2-naphthol | 4,6-dinitro-2-aminophenol | 2-(N-methyl-N-vinylsulfonylamino)-8-naphthol-6-sulfonic acid. | Do. |

We claim:
1. A water-soluble 1:2-chromium complex monoazo dyestuff of the formula

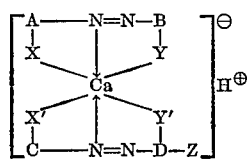

wherein A and C represent phenylene or naphthylene or phenylene or naphthylene substituted by chlorine, nitro, sulfonamide or lower alkyl, B represents naphthylene or 1-phenyl-3-lower alkyl-5-pyrazolone, D represents naphthylene or

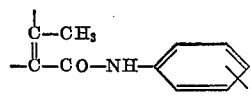

X and X' represent —O— or —COO—, Y and Y' represent —O— or —NH—, the moieties Y and Y' being in a position adjacent to the azo groupings, and Z represents

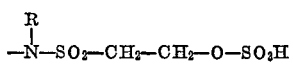

or

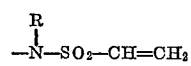

in which R is hydrogen, methyl or ethyl, said dyestuff being mono- or di-substituted by —SO₃H on the moieties A, B, C and D when Z is

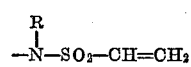

2. The water-soluble dyestuff of the formula

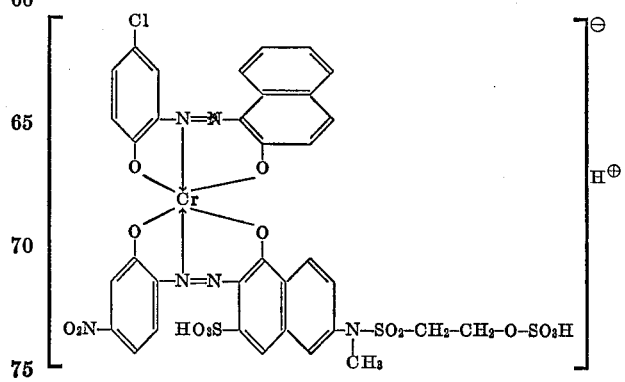

3. The water-soluble dyestuff of the formula
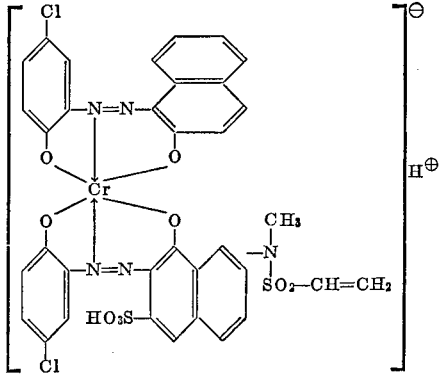
4. The water-soluble dyestuff of the formula
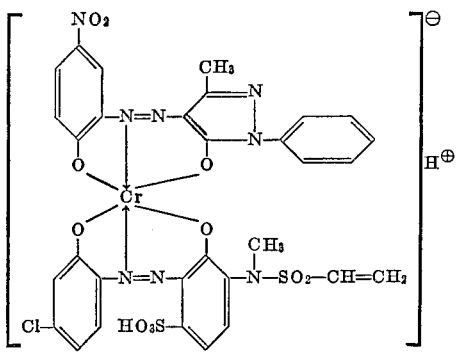
5. The water-soluble dyestuff of the formula
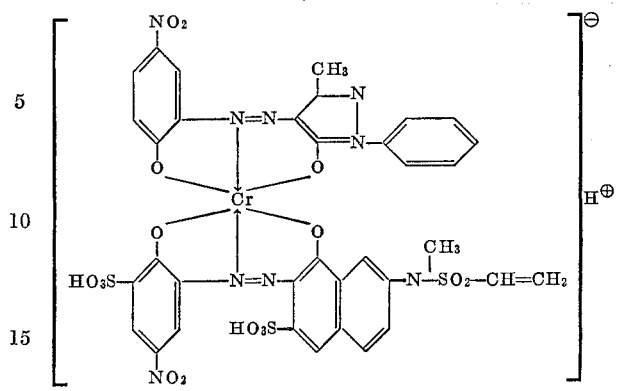
6. The water-soluble dyestuff of the formula
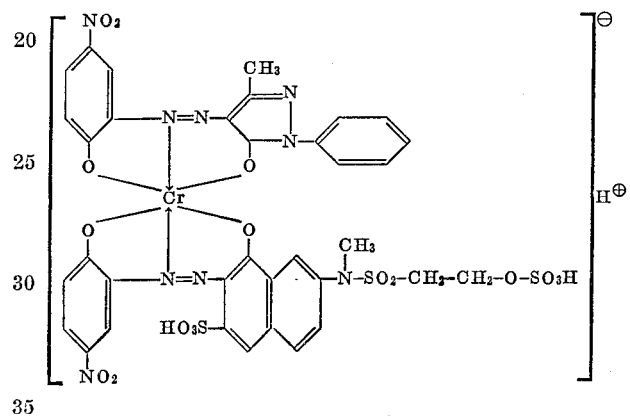
References Cited
UNITED STATES PATENTS
3,086,967   4/1963   Davies et al. _____ 260—145
3,308,114   3/1967   Blackhall _____ 260—145
FLOYD D. HIGEL, Primary Examiner
U.S. Cl. X.R
8—13, 42, 43, 63, 71; 260—147, 150, 151, 198, 199